US 9,981,642 B2

(12) United States Patent
Kim

(10) Patent No.: US 9,981,642 B2
(45) Date of Patent: May 29, 2018

(54) ELECTRIC BRAKE SYSTEM AND METHOD THEREOF

(71) Applicant: MANDO CORPORATION, Gyeonggi-do (KR)

(72) Inventor: Hak-Burm Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days. days.

(21) Appl. No.: 15/422,387

(22) Filed: Feb. 1, 2017

(65) Prior Publication Data

US 2017/0217415 A1 Aug. 3, 2017

(30) Foreign Application Priority Data

Feb. 2, 2016 (KR) .................. 10-2016-0012835

(51) Int. Cl.
*B60T 13/14* (2006.01)
*B60T 8/171* (2006.01)
*B60T 8/172* (2006.01)
*B60T 13/66* (2006.01)
*B60T 13/68* (2006.01)
(Continued)

(52) U.S. Cl.
CPC ............ *B60T 13/145* (2013.01); *B60T 7/042* (2013.01); *B60T 8/171* (2013.01); *B60T 8/172* (2013.01);
(Continued)

(58) Field of Classification Search
CPC .......... B60T 7/042; B60T 7/18; B60T 13/145; B60T 13/146; B60T 13/662;
(Continued)

(56) References Cited

U.S. PATENT DOCUMENTS 6,007,163 A * 12/1999 Sawada ................. B60T 8/3275
303/116.2
2008/0229741 A1* 9/2008 Isono ...................... B60T 7/042
60/581

(Continued)

*Primary Examiner* — Vishal R Sahni
(74) *Attorney, Agent, or Firm* — Ladas & Parry, LLP

(57) ABSTRACT

Electronic brake system is disclosed. An electronic brake system includes, a pressure sensor including a first pressure sensor configured to measure a hydraulic pressure of the accumulator, a second pressure sensor configured to measure a hydraulic pressure of the first hydraulic circuit, and a third pressure sensor configured to measure a hydraulic pressure of the second hydraulic circuit, a driver including one or more apply valves and release valves configured to control the hydraulic pressures of the first hydraulic circuit and the second hydraulic circuit, a determiner configured to determine that at least one of the first hydraulic circuit and the second hydraulic circuit has failed when an absolute value of a slope of the pressure measured by the first pressure sensor is greater than a preset first threshold value and the pressure measured by the first pressure sensor is less than a preset second threshold value and a controller configured to close apply valves of the first hydraulic circuit and the second hydraulic circuit when the failure has been determined, determine that a leak has occurred in one of the first and second hydraulic circuits having an amount of pressure change greater than that of the other hydraulic circuit measured on the basis of the second pressure sensor and the third pressure sensor, and control braking using only the hydraulic circuit operating normally.

12 Claims, 10 Drawing Sheets

(51) Int. Cl.
  *B60T 15/04* (2006.01)
  *B60T 7/04* (2006.01)
  *B60T 8/88* (2006.01)
(52) U.S. Cl.
  CPC ............ *B60T 8/885* (2013.01); *B60T 13/146* (2013.01); *B60T 13/662* (2013.01); *B60T 13/686* (2013.01); *B60T 15/045* (2013.01); *B60T 2270/403* (2013.01)
(58) Field of Classification Search
  CPC ........ B60T 13/686; B60T 8/171; B60T 8/172; B60T 8/885; B60T 15/045; B60T 2270/403
  See application file for complete search history.

(56) References Cited

U.S. PATENT DOCUMENTS

| | | | |
|---|---|---|---|
| 2010/0212314 A1* | 8/2010 | Isono | B60T 8/885 60/545 |
| 2012/0256477 A1* | 10/2012 | Miyazaki | B60T 8/4081 303/6.01 |
| 2014/0306515 A1* | 10/2014 | Claussen | B60T 8/328 303/116.1 |
| 2015/0091370 A1* | 4/2015 | Yamasaki | B60T 7/042 303/11 |
| 2015/0166028 A1* | 6/2015 | Kim | B60T 13/145 303/10 |
| 2017/0050629 A1* | 2/2017 | Kim | B60T 8/4081 |

* cited by examiner

ELECTRIC BRAKE SYSTEM AND METHOD THEREOF

CROSS-REFERENCE TO RELATED APPLICATION

This application claims the benefit of Korean Patent Application No. 2016-0012835, filed on Feb. 2, 2016 in the Korean Intellectual Property Office, the disclosure of which is incorporated herein by reference.

BACKGROUND

1. Field

Embodiments of the present disclosure relate to an electronic brake system, and more particularly, to an electronic brake system configured to perform in-circuit control for detecting a hydraulic circuit failure and preventing an accident and a control method thereof.

2. Description of the Related Art

Brake systems have to be installed for braking in vehicles, and recently, various types of systems have been proposed for obtaining more powerful and stable braking force.

Examples of the brake systems are an anti-lock brake system (ABS) configured to prevent wheels from slipping during breaking, a brake traction control system (BTCS) configured to prevent driving wheels from slipping when vehicles are suddenly or rapidly accelerated, and a vehicle attitude control (that is, electronic stability control (ESC)) system which combines the ABS and the BTCS to control brake hydraulic pressure and maintains a stable state for vehicle driving.

In general, an electronic brake system includes a hydraulic pressure supplier configured to receive a braking will of a driver as an electrical signal from a pedal displacement sensor configured to detect a displacement of a brake pedal when the driver steps on the brake pedal.

The hydraulic pressure supplier is provided to operate a motor according to a force applied to the brake pedal and generate a braking pressure. Here, the braking pressure is generated by converting a rotational force of the motor into a linear motion that presses a piston.

Active hydraulic booster (AHB) systems have recently been installed in vehicles such as hybrid cars, fuel cell cars, and electric cars.

In general, the AHB system is a brake system in which an electronic control unit (ECU) configured to perform overall control of the system when a driver stepping on a brake pedal is detected, generates a hydraulic pressure using a hydraulic power unit (HPU) configured to generate the hydraulic pressure using a motor, supplies the hydraulic pressure to a master cylinder, and generates a braking force by transmitting a braking hydraulic pressure to wheel cylinders of wheels using an ESC system configured to control a braking force of the wheels.

Such an AHB system generates a necessary pressure for braking through valve control when a driver brakes. Valves used for the valve control include apply valves configured to supply a hydraulic pressure to wheel cylinders, cut valves configured to maintain the supplied hydraulic pressure, release valves configured to discharge the hydraulic pressure supplied to the wheel cylinders, and simulation valves configured to generate a force applied to a brake pedal.

When the AHB system operates normally, the AHB system operates by receiving a brake pedal signal when a driver steps on a brake pedal, and the apply valve is opened according to the operation of the AHB system, a high pressure brake fluid filled in a high pressure accumulator passes through the apply valve and is supplied to a boost circuit (BC), and a pressure of the BC is increased. At this time, the cut valves are simultaneously blocked to maintain the brake pressure. In addition, when the simulation valve is opened, the hydraulic pressure in the master cylinder pushes a spring in a pedal simulator to generate a pedal simulator pressure corresponding to a reaction force of the brake pedal.

However, when a hydraulic circuit failure, such as a leak in the BC, occurs, there is a concern in that the HPU continuously generates a hydraulic pressure and supplies the hydraulic pressure to the master cylinder, and a dangerous situation in which a braking force is not generated due to lack of a brake fluid occurs when the pressure is exhausted.

SUMMARY

Therefore, it is an aspect of the present disclosure to prevent a dangerous situation in which a braking force is not generated at all by determining a hydraulic circuit failure in advance.

In addition, it is another aspect of the present disclosure to obtain braking performance necessary for satisfying a braking distance in accordance with a vehicle braking performance regulation during braking after a hydraulic brake circuit failure occurs.

Additional aspects of the disclosure will be set forth in part in the description which follows and, in part, will be obvious from the description, or may be learned by practice of the disclosure.

In accordance with an aspect of the present invention, An electronic brake system including a motor configured to drive a pump for pumping brake oil from a reservoir of a master cylinder, an accumulator configured to store the pumped brake oil according to operation of the pump driven by the motor, a first hydraulic circuit configured to control a hydraulic pressure generated by the accumulator to be transmitted to at least one first wheel, and a second hydraulic circuit configured to control the hydraulic pressure generated by the accumulator to be transmitted to at least one second wheel, the electronic brake system includes: a pressure sensor including a first pressure sensor configured to measure a hydraulic pressure of the accumulator, a second pressure sensor configured to measure a hydraulic pressure of the first hydraulic circuit, and a third pressure sensor configured to measure a hydraulic pressure of the second hydraulic circuit; a driver including one or more apply valves and release valves configured to control the hydraulic pressures of the first hydraulic circuit and the second hydraulic circuit; a determiner configured to determine that at least one of the first hydraulic circuit and the second hydraulic circuit has failed when an absolute value of a slope of the pressure measured by the first pressure sensor is greater than a preset first threshold value and the pressure measured by the first pressure sensor is less than a preset second threshold value; and a controller configured to close apply valves of the first hydraulic circuit and the second hydraulic circuit when the failure has been determined, determine that a leak has occurred in one of the first and second hydraulic circuits having an amount of pressure change greater than that of the other hydraulic circuit measured on the basis of the second pressure sensor and the third pressure sensor, and control braking using only the hydraulic circuit operating normally.

The determiner may further determine that at least one of the first hydraulic circuit and the second hydraulic circuit has failed when the absolute value of the slope of the pressure measured by the first pressure sensor is greater than the preset first threshold value, and at least one of the pressures measured by the second pressure sensor and the third pressure sensor is less than a preset third threshold value.

The determination that the leak has occurred in one of the first and second hydraulic circuits having the amount of pressure change greater than that of the other hydraulic circuit measured on the basis of the second pressure sensor and the third pressure sensor after the apply valves of the first hydraulic circuit and the second hydraulic circuit are closed determines that the leak has occurred in one of the first and second hydraulic circuits having an amount of pressure change greater than that of the other hydraulic circuit when a difference between the amount of pressure change measured by the second pressure sensor and the amount of pressure change measured by the third pressure sensor is greater than the preset third threshold value.

The determination that the leak has occurred in one of the first and second hydraulic circuits having the amount of pressure change greater than that of the other hydraulic circuit measured on the basis of the second pressure sensor and the third pressure sensor after the apply valves of the first hydraulic circuit and the second hydraulic circuit are closed is determined within a preset time.

The amount of pressure change measured by the second pressure sensor may denote a difference between a pressure measured at a time at which the apply valve included in the first hydraulic circuit is closed and a pressure measured after a preset first time from a time at which the apply valve is opened; and the amount of pressure change measured by the third pressure sensor may denote a difference between a pressure measured at a time at which the apply valve included in the second hydraulic circuit is closed and a pressure measured after the preset first time from a time at which the apply valve is closed.

The controller may form the hydraulic circuit that has been determined to have the leak into a closed circuit.

In accordance with another aspect of the present invention, A control method of an electronic brake system including a motor configured to drive a pump for pumping brake oil from a reservoir of a master cylinder, an accumulator configured to store the pumped brake oil according to operation of the pump driven by the motor, a first hydraulic circuit configured to control a hydraulic pressure generated by the accumulator to be transmitted to at least one first wheel, and a second hydraulic circuit configured to control the hydraulic pressure generated by the accumulator to be transmitted to at least one second wheel, the control method includes: measuring a hydraulic pressure of the accumulator, a hydraulic pressure of the first hydraulic circuit, and a hydraulic pressure of the second hydraulic circuit; driving valves included in the first hydraulic circuit and the second hydraulic circuit on the basis of the measured hydraulic pressure of the accumulator, the measured hydraulic pressure of the first hydraulic circuit, and the measured hydraulic pressure of the second hydraulic circuit; determining that at least one of the first hydraulic circuit and the second hydraulic circuit has failed when a magnitude of a slope of the measured hydraulic pressure of the accumulator is greater than a preset first threshold value and the measured hydraulic pressure of the accumulator is less than a preset second threshold value; closing apply valves included in the first hydraulic circuit and the second hydraulic circuit when the failure is determined; determining that a leak has occurred in one of the first and second hydraulic circuits having an amount of hydraulic pressure change greater than that of the other hydraulic circuit measured on the basis of the hydraulic pressures of the first hydraulic circuit and the second hydraulic circuit measured after the apply valves are closed; and determining that one of the first and second hydraulic circuits having an amount of hydraulic pressure change less than that of the other hydraulic circuit measured on the basis of the hydraulic pressures of the first hydraulic circuit and the second hydraulic circuit measured after the apply valves are closed operates normally, and controlling braking of only the hydraulic circuit operating normally.

Determining that the leak has occurred in one of the first and second hydraulic circuits may have the amount of pressure change greater than that of the other hydraulic circuit measured on the basis of the second pressure sensor and the third pressure sensor after the apply valves of the first hydraulic circuit and the second hydraulic circuit is performed within a preset time.

Determining that at least one of the first hydraulic circuit and the second hydraulic circuit may have failed when the magnitude of the slope of the hydraulic pressure of the accumulator is greater than the preset first threshold value and at least one of the hydraulic pressures of the first hydraulic circuit and the second hydraulic circuit is less than a preset third threshold value.

The determining that the leak has occurred in one of the first and second hydraulic circuits having the amount of hydraulic pressure change greater than that of the other hydraulic circuit measured on the basis of the hydraulic pressures of the first hydraulic circuit and the second hydraulic circuit after the apply valves are opened determines that the leak has occurred in one of the first and second hydraulic circuits having an amount of hydraulic pressure change greater than that of the other hydraulic circuit when a difference between the amount of hydraulic pressure change of the first hydraulic circuit and the amount of hydraulic pressure change of the second hydraulic circuit is greater than the preset third threshold value.

The amount of hydraulic pressure change may denote a difference between an amount of hydraulic pressure change measured at a time at which the apply valves are closed and an amount of hydraulic pressure change measured after a preset first time passes from a time at which the apply valves are opened.

The control method may further comprise forming the one of the first and second hydraulic circuits that has been determined to have the leak into a closed circuit.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
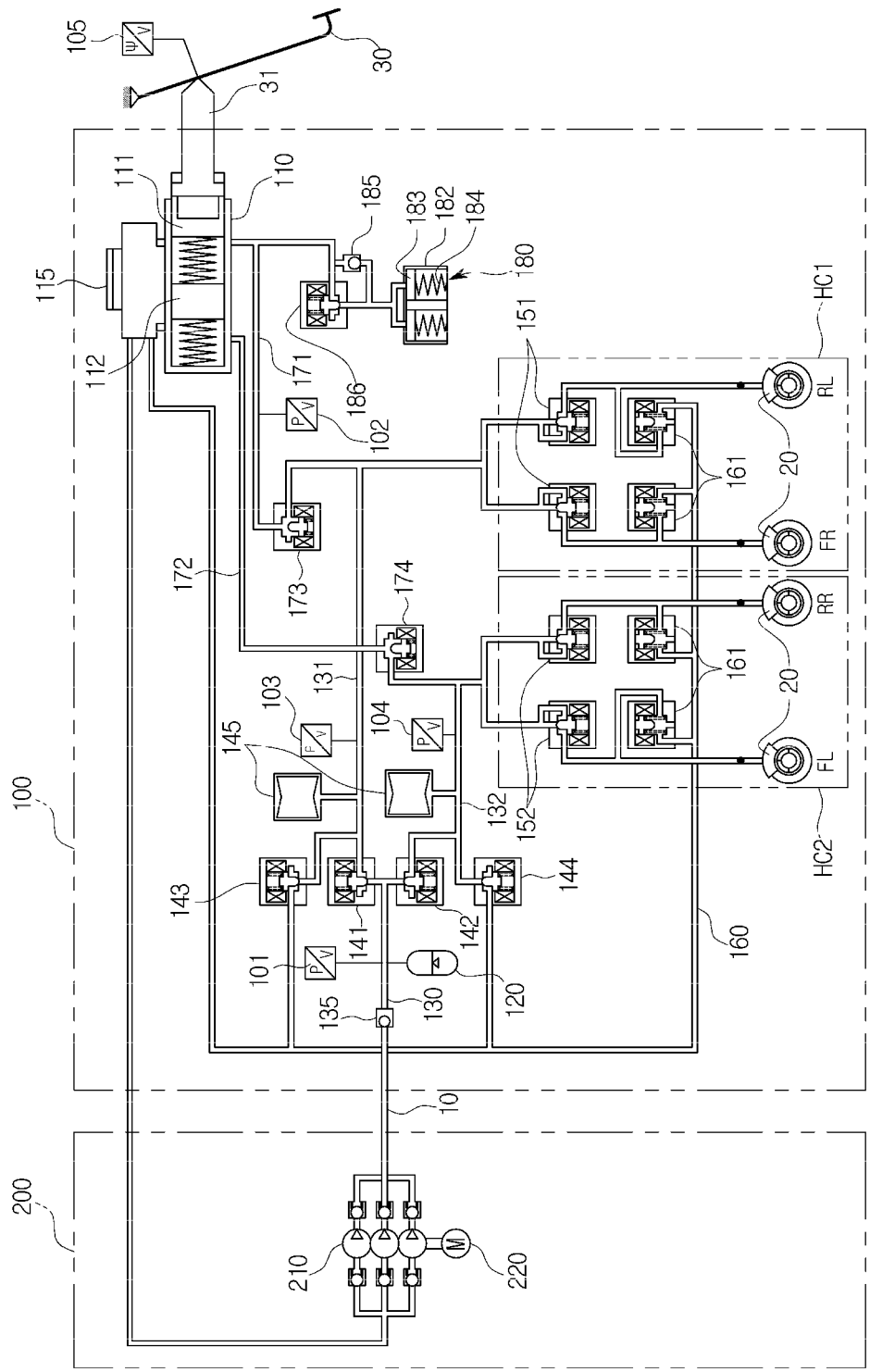
FIG. 1 is a view illustrating a hydraulic circuit diagram of an electronic brake system of a vehicle according to one embodiment of the present disclosure.

Hereinafter, embodiments of the present disclosure will be described in detail with reference to the accompanying drawings. The present embodiments are provided in order to fully explain the spirit and scope of the present disclosure to those skilled in the art. Thus, the present disclosure is not to be construed as limited to the present embodiments set forth herein and may be embodied in other various forms. Parts irrelevant to the description are omitted in the drawings in order to clearly explain the present disclosure. Sizes of elements in the drawings may be exaggerated in order to facilitate understanding.

FIG. 1 is a view illustrating a hydraulic circuit diagram of an electronic brake system of a vehicle according to one embodiment of the present disclosure.

Referring to FIG. 1, an active hydraulic booster (AHB) system may be mainly divided into two units including a hydraulic pressure control system 100 and a power source unit 200.

The hydraulic pressure control system 100 includes a brake pedal 30 manipulated by a driver during braking, a master cylinder 110 to which a force is transmitted from the brake pedal 30, a reservoir 115 coupled to an upper portion of the master cylinder 110 and configured to store oil, two hydraulic circuits HC1 and HC2 each connected to two of wheels RR, RL, FR, and FL, an accumulator 120 configure to maintain a predetermined level of pressure, a pedal simulator 180 connected to the master cylinder 110 and provided to supply a reaction force of the brake pedal 30, and a simulation valve 186 on a path 188 configured to connect the pedal simulator 180 and the reservoir 115.

In addition, the hydraulic pressure control system 100 may further include apply valves 141 and 142, release valves 143 and 144, pressure sensors 101, 102, 103, and 104, and the like connected to two hydraulic circuits HC1 and HC2 to control a pressure transmitted from the accumulator 120 to wheel cylinders 20 installed at the wheels FL, FR, RL, RR.

The power source unit 200 includes a pump 210 configured to suction oil from the reservoir 115 and discharge the oil into the accumulator 120 to generate a pressure at the accumulator 120, and a motor 220 configured to drive the pump 210.

The hydraulic pressure control system 100 and the power source unit 200 are connected by an external pipe 10. That is, the pump 210 of the power source unit 200 and the accumulator 120 of the hydraulic pressure control system 100 are connected by the external pipe 10. The power source unit 200 including the pump 210 and the motor 220 is formed as a separate unit to separate an operating noise thereof from that of the hydraulic pressure control system 100, and the master cylinder 110, the reservoir 115, and the pedal simulator 180 are integrated as a single product in the hydraulic pressure control system 100, and electronic stability control (ESC) and hydraulic power unit (HPU) functions are included in the hydraulic pressure control system 100 so that a weight and installation space of the AHB system is decreased.

Hereinafter, structures and functions of components included in the electronic brake system of a vehicle will be further specifically described.

First, the master cylinder 110 includes a first piston 111 and a second piston 112 to have two hydraulic circuits and generates a hydraulic pressure by a pedal effort of the brake pedal 30. The master cylinder 110 is connected to two hydraulic circuits HC1 and HC2. The reason why the master cylinder 110 is connected two hydraulic circuits is for securing safety when a failure occurs. For example, a first circuit of two hydraulic circuits of the master cylinder 110 is connected to a front-right wheel FR and a rear-left wheel RL, and the other circuit is connected to a front-left wheel FL and a rear-right wheel in a vehicle.

The master cylinder 110 includes an upper portion in which the reservoir 115 configured to store oil is installed and a lower portion so that oil discharged through outlets thereof is introduced into the wheel cylinders 20 installed at the wheels RR, RL, FR, and FL.

Meanwhile, an undescribed numeral 31 is an input rod configured to transmit a pedal effort of the master cylinder 110 and installed at the brake pedal 30.

One or more pumps 210 are provided to generate a braking force by pumping oil introduced from the reservoir 115 at high pressure, and the motor 220 is provided at one side of the pump 210 to supply a driving force to the pump 210.

The accumulator 120 is provided at a side of an outlet of the pump 210 to temporarily store a high pressure oil generated by the pump 210. That is, the accumulator 120 is connected to the pump 210 by the external pipe 10. Here, a check valve 135 is installed at the external pipe 10 to prevent the high pressure oil stored in the accumulator 120 from back flowing.

The first pressure sensor 101 is provided at a side of an outlet of the accumulator 120 to measure an oil pressure of the accumulator 120. Here, the oil pressure measured by the first pressure sensor 101 is compared to a set pressure by an electronic control unit (ECU) 12, which will be described below, and when the measured pressure is less than the set pressure, oil in the reservoir 115 is suctioned by the pump 210 being driven using the motor 220 and filled in the accumulator 120.

A connecting path 130 is connected to the external pipe 10 to transmit braking oil stored in the accumulator 120 to the wheel cylinders 20. The connecting path 130 includes a first inlet path (BC1) 131 connected to the first hydraulic circuit HC1 and a second inlet path (BC2) 132 connected to the second hydraulic circuit HC2.

The first apply valve 141 and the first release valve 143 configured to control braking oil stored in the accumulator 120 are provided in the first inlet path (BC1) 131. The second apply valve 142 and the second release valve 144 configured to control the brake oil stored in the accumulator 120 are provided in the second inlet path (BC2) 132. That is, the braking oil in the accumulator 120 may be transmitted to the wheel cylinders 20 by the first inlet path 131 and the second inlet path 132.

Each of the first and second apply valves 141 and 142 and the first and second release valves 143 and 144 may be formed as a normally closed solenoid valve configure to maintain a normally closed state. Accordingly, when a driver steps on the brake pedal 30, the first and second apply valves 141 and 142 are opened to transmit the braking oil stored in the accumulator 120 to the wheel cylinders 20.

The second pressure sensor 103 is provided in the first inlet path (BC1) 131. The second pressure sensor 103 detects a pressure of brake oil transmitted to the first inlet path (BC1) 131. The pressure detected by the second pressure sensor 103 corresponds to pressures of the wheel cylinders 20 of the front-left wheel and the rear-right wheel.

The third pressure sensor 104 is provided in the second inlet path (BC2) 132. The third pressure sensor 104 detects a pressure of brake oil transmitted to the second inlet path (BC2) 132. The pressure detected by the third pressure sensor 104 corresponds to pressures of the wheel cylinders 20 of the front-right wheel and the rear-left wheel.

First inlet valves 151 are provided between the wheel cylinders 20 connected to the first inlet path (BC1) 131, and second inlet valves 152 are provided between the wheel cylinders 20 connected to the second inlet path (BC2) 132

Each of the first inlet valves 151 may be formed as a normally open solenoid valve configured to maintain a normally open state. The first inlet valves 151 adjust an amount of braking oil supplied from the accumulator 120 to the wheel cylinders 20 when the first apply valve 141 is opened. The second inlet valves 152 may be formed to perform the same action as the first inlet valves 151.

In addition, the hydraulic pressure control system 100 may be provided to include a return path 160 configured to connect the wheel cylinders 20 and the master cylinder 110. Discharging valves 161 configured to discharge oil in the wheel cylinders 20 into the reservoir 115 are provided in the middle of the return path 160. Each of the discharging valves 161 may be formed as a normally closed solenoid valve configured to maintain the normally closed state.

In addition, the hydraulic pressure control system 100 may include a pulsation attenuation device 145 provided in each of the first inlet path (BC1) 131 and the second inlet path (BC2) 132 to minimize pressure pulsation. The pulsation attenuation devices 145 are devices capable of temporarily storing oil to attenuate pulsation generated between the inlet valves 151 and 152 and both of the apply valves 141 and 142 and the release valves 143 and 144.

A first backup path 171 and a second backup path 172 form paths between the master cylinder 110 and the wheel cylinders 20 to provide braking pressures to the wheel cylinders by operating the brake pedal when an integrated electronically controlled hydraulic brake system fails.

A first cut valve 173 configured to open or close the first backup path 171 is provided in the middle of the first backup path 171. A second cut valve 174 configured to open or close the second backup path 172 is provided in the middle of the second backup path 172.

The first backup path 171 is connected to the first inlet path (BC1) 131 through the first cut valve 173, and the second backup path 172 is connected to the second inlet path (BC2) 132 through the second cut valve 174. The first backup path 171 and the second backup path 172 are respectively blocked by the first cut valve 173 and the second cut valve 174 during normal braking.

Each of the first cut valve 173 and the second cut valve 174 may be formed as a normally open solenoid valve configured to maintain the normally open state.

The fourth pressure sensor 102 configured to detect a pressure of the pedal simulator 180 (or the master cylinder 110) is provided between the first cut valve 173 and the master cylinder 110. The pressure detected by the fourth pressure sensor 102 corresponds to the pressure of the pedal simulator or the master cylinder 110.

The pedal simulator 180 configured to generate a force applied to the brake pedal 30 is provided between the fourth pressure sensor 102 and the master cylinder 110.

The pedal simulator 180 includes a simulation chamber 182 provided to store oil discharged from an outlet of the master cylinder 110 and the simulation valve 186 provided at a side of an inlet of the simulation chamber 182. The simulation chamber 182 includes a piston 183 and an elastic member 184 to be formed to have a predetermined displacement range though oil introduced into the simulation chamber 182. The simulation valve 186 is formed as a normally closed solenoid valve configured to maintain the normally closed state and is opened to transmit braking oil to the simulation chamber 182 when a driver steps on the brake pedal 30.

In addition, a simulation check valve 185 is provided between the pedal simulator 180 and the master cylinder 110, that is, between the pedal simulator 180 and the simulation valve 186, and the simulation check valve 185 is connected to the master cylinder 110. The simulation check valve 185 is provided to transmit a pressure according to the pedal effort of the brake pedal 30 to the pedal simulator 180 only through the simulation valve 186. The simulation check valve 185 may be formed as a piping check valve which excludes a spring so that a residual pressure of the pedal simulator 180 is restored when the force applied to the brake pedal 30 is released.

Meanwhile, a pedal stroke sensor 105 configured to detect a pedal stroke of the brake pedal 30 is provided at a side of the brake pedal 30. The pedal stroke sensor 105 may detect the pedal stroke of the brake pedal 30, which changes when a driver steps on the brake pedal 30.

Figure 2:
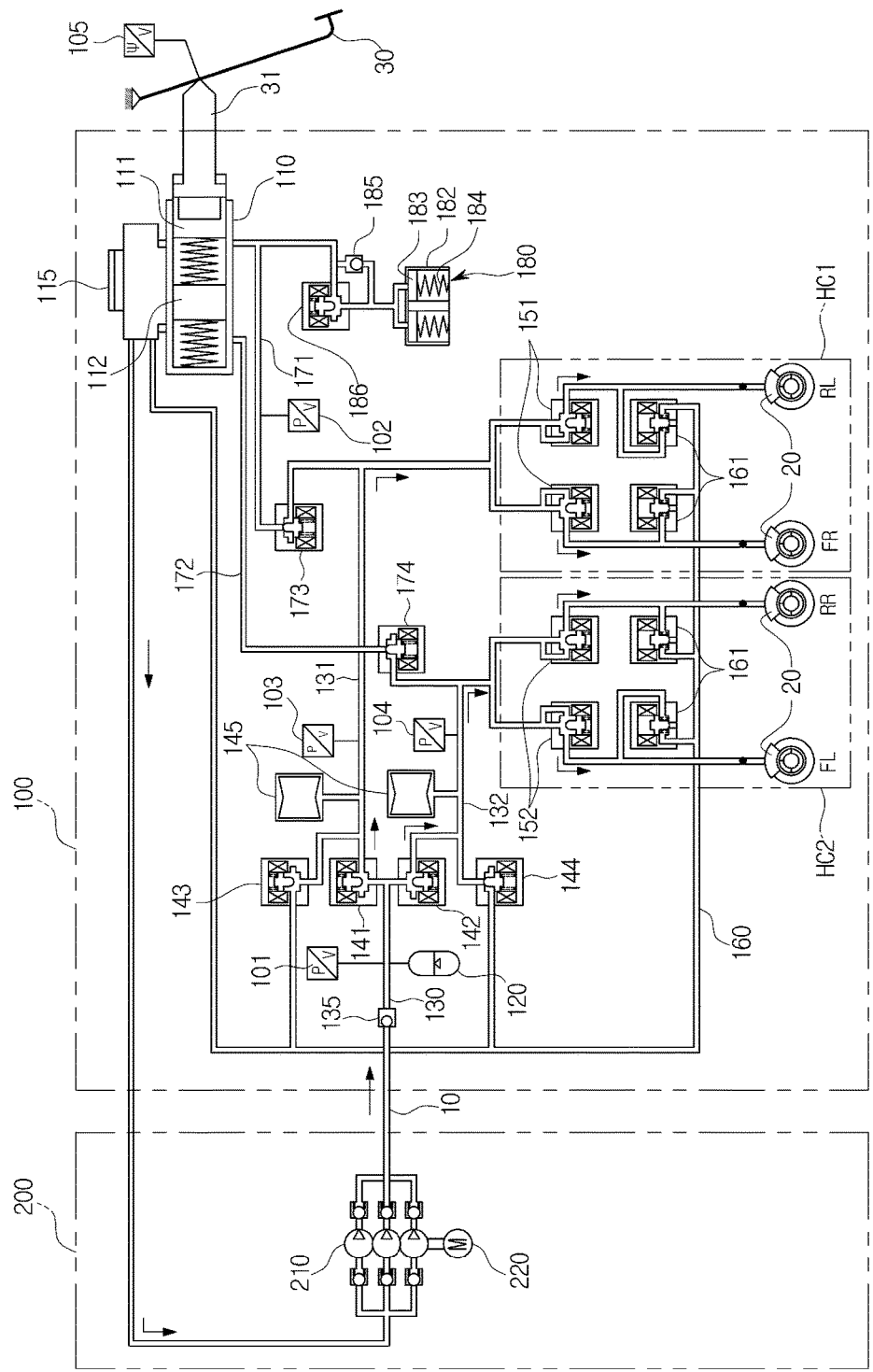
FIG. 2 is a view illustrating a hydraulic circuit diagram for describing a flow of a hydraulic pressure during normal braking in the electronic brake system of a vehicle according to one embodiment of the present disclosure.
Figure 3:
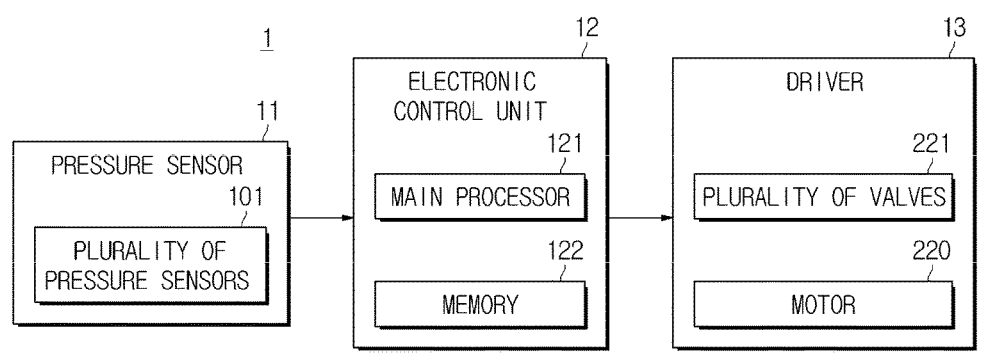
FIG. 3 is a schematic block diagram illustrating the electronic brake system of a vehicle according to one embodiment of the present disclosure.
Figure 4:
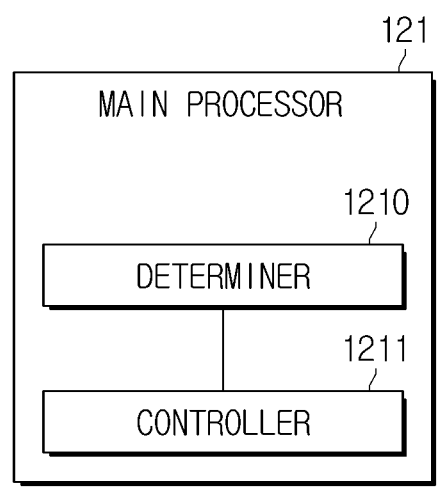
FIG. 4 is a block diagram illustrating a configuration of a main processor.

Next, FIG. 2 is a view illustrating a hydraulic circuit diagram for describing a flow of a hydraulic pressure during normal braking in the electronic brake system of a vehicle according to one embodiment of the present disclosure, FIG. 3 is a schematic block diagram illustrating the electronic brake system of a vehicle according to one embodiment of the present disclosure, and FIG. 4 is a block diagram illustrating a configuration of a main processor.

First, referring to FIG. 2, when a driver steps on the brake pedal 30, the ECU 12 detects a pedal stroke of the brake pedal 30 through the pedal stroke sensor 105 and determines a braking amount required by the driver according to the detected pedal stroke of the brake pedal 30.

The ECU 12 may receive a magnitude of a regenerative braking amount and calculate a magnitude of a frictional braking amount according to a difference between the braking amount required by the driver and the regenerative braking amount to determine a magnitude of a pressure increase or pressure decrease of each of the wheel cylinders 20.

Specifically, when the driver steps on the brake pedal 30, the ECU 12 calculates the frictional braking amount based on the braking amount required by the driver according to the pedal stroke of the brake pedal 30 and the regenerative braking amount and operates the pump 210 to generate the calculated frictional braking amount using the motor 220 to fill the accumulator 120 with high pressure braking oil. In this state, the ECU 12 opens the first and second apply valves 141 and 142 to supply the high pressure braking oil filled in the accumulator 120 to each of the wheel cylinders 20

At this time, the ECU 12 detects pressures of the pressure sensors 103 and 104 provided in the first and second inlet paths 131 and 132 and controls operations of the apply valves 141 and 142 based on the detected pressures.

The ECU 12 simultaneously opens the apply valves 141 and 142 and closes the first and second cut valves 173 and 174 provided on the first and second backup paths 171 and 172 to block the first and second backup paths 171 and 172. Accordingly, braking oil supplied to the wheel cylinders 20 through the first and second apply valves 141 and 142 does not back flow to the first and second backup paths 171 and 172. Accordingly, paths between the master cylinder 110 and the first and second cut valves 173 and 174 form closed circuits.

Hydraulic flows are generated in directions of arrows in the drawing according to a sequential operation of the above-described components In addition, the ECU 12 simultaneously opens the apply valves 141 and 142, closes the first and second cut valves 173 and 174, and opens the simulation valve 186 of the pedal simulator 180 to generate a pedal simulator pressure. A pressure generated by the master cylinder 110 being pressed according to a force applied to the brake pedal 30 is transmitted to the pedal simulator 180 connected to the master cylinder 110. When the simulation valve 186 is opened, a hydraulic pressure is supplied to the simulation chamber 182. The hydraulic pressure supplied to the simulation chamber 182 moves the piston 183. When a load is applied to the elastic member 184, such as a spring, configured to support the piston 183 by the piston 183 being moved, a corresponding pressure is generated in the simulation chamber 182. This pressure is the pedal simulator pressure and acts as the force applied to the brake pedal 30 to provide a proper pedal feeling to the driver.

However, since a pressure measured by the second pressure sensor 103 or the third pressure sensor 104 does not satisfy a target pressure and a hydraulic pressure is continuously supplied from the accumulator 120 to the first inlet path 131 or the second inlet path 132 when a leak occurs in the first inlet path 131 or the second inlet path 132, a dangerous situation in which a braking force is not generated may occur when all the brake fluid is exhausted.

Accordingly, in one embodiment of the present disclosure, the ECU 12 may determine that the first inlet path 131 or the second inlet path 132 has failed based on pressures of sensors measured by the plurality of pressure sensors 101 to 104 and control the electronic brake system 1 of a vehicle.

Specifically, FIG. 3 is a schematic block diagram illustrating the electronic brake system of a vehicle according to one embodiment of the present disclosure.

Referring to FIG. 3, the electronic brake system 1 of a vehicle according to the embodiment of the present disclosure includes a pressure sensor 11, the ECU 12, and a driver 13.

The pressure sensor 11 includes the plurality of pressure sensors 101 to 104.

Specifically, the electronic brake system 1 includes the first pressure sensor 101 configured to measure the pressure of the accumulator 120, the second pressure sensor 103 configured to detect the pressure of the brake oil transmitted to the first inlet path (BC1) 131, the third pressure sensor 104 configured to detect the pressure of the brake oil transmitted to the second inlet path (BC2) 132, and the fourth pressure sensor 102 configured to detect the pressure of the pedal simulator 180 (or the master cylinder 110).

Here, the plurality of pressure sensors 101 to 104 transmit the pressures measured by the plurality of pressure sensors 101 to 104 to the ECU 12.

The ECU 12 generally controls the electronic brake system 1 of a vehicle according to the embodiment of the present disclosure.

Specifically, the ECU 12 includes a main processor 121 configured to determine whether the first inlet path (BC1) 131 or the second inlet path (BC2) 132 has failed on the basis of the pressures received from the plurality of pressure sensors 101 to 104 and generate a corresponding control signal, and a memory 122 configured to store various data.

That is, as illustrated in FIG. 4, the main processor 121 may include a determiner 1210 configured to determine whether the first inlet path (BC1) 131 or the second inlet path (BC2) 132 has failed on the basis of the pressures received from the plurality of pressure sensors 101 to 101 through software, and a controller 1211 configured to generate a control signal in response to the result of the determiner 1210.

Next, the driver 13 drives a plurality of valves 221 and the motor 220 according to the control signal generated by the ECU 12.

Hereinafter, an operation of the main processor 121 of the ECU 12 will be described in detail. Specifically, FIGS. 5 and 6 are graphs showing pressures of pressure sensors included in the electronic brake system of a vehicle according to one embodiment of the present disclosure according to time.

First, the determiner 1210 in the main processor 121 receives pressure values of the plurality of pressure sensors 101 to 104 received from the pressure sensor 11.

Figure 5:
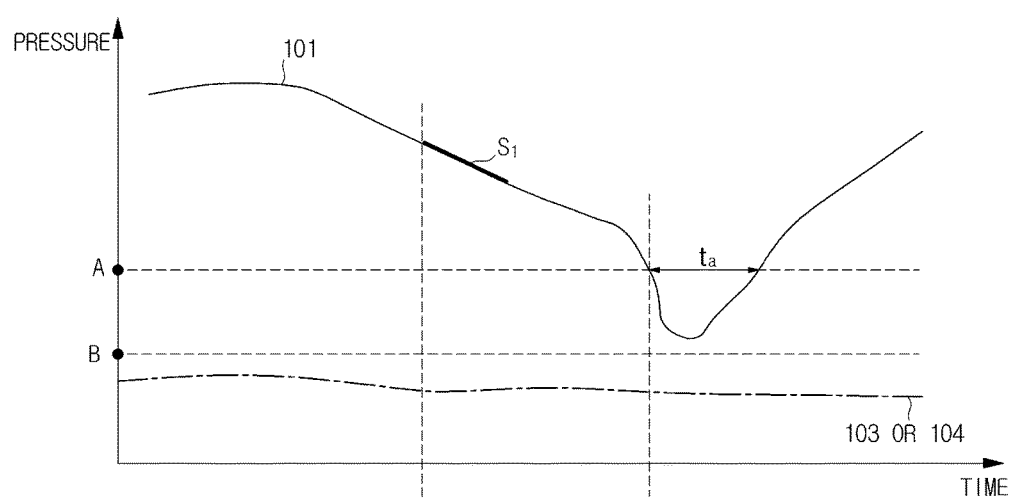
FIGS. 5 and 6 are graphs showing pressures of pressure sensors included in the electronic brake system of a vehicle according to one embodiment of the present disclosure according to time.
Figure 6:
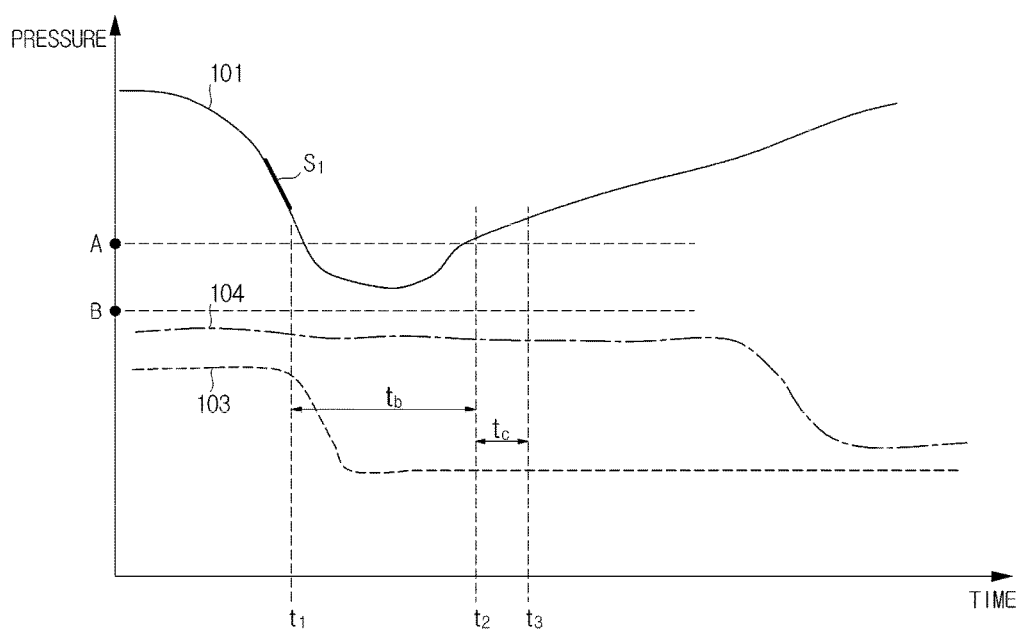

The graph shown in FIG. 5 shows the pressure measured by the first pressure sensor 101 over time and the pressure measured by the second pressure sensor 103 configured to detect the pressure of the brake oil transmitted to the first inlet path (BC1) 131 or by the third pressure sensor 104 configured to detect the pressure of the brake oil transmitted to the second inlet path (BC2) 132 over time.

The main processor 121 continuously receives a value of the first pressure sensor 101 to determine whether a magnitude of a pressure reduction rate is greater than a preset slope Si.

As the first pressure sensor 101 is configured to measure the pressure of the accumulator, a dangerous situation in which a braking force is insufficient due to a lack of brake fluid may occur when the pressure of the accumulator continuously decreases.

Next, the determiner 1210 in the main processor 121 continuously receives the value of the first pressure sensor 101, and when the magnitude of the pressure reduction rate is greater than the preset slope Si and the pressure of the first pressure sensor 101 is maintained at a value less than a preset pressure A for to seconds, the determiner 1210 determines that a failure has occurred in the electronic brake system 1 according to the embodiment of the present disclosure.

In addition, the determiner 1210 in the main processor 121 continuously receives the value of the first pressure sensor 101, and when the magnitude of the pressure reduction rate is greater than the preset slope Si and the pressure measured by the second pressure sensor 103 or the third pressure sensor 104 is less than a preset pressure B, the determiner 1210 determines that a failure has occurred in the electronic brake system 1 according to the embodiment of the present disclosure.

That is, when a hydraulic pressure of the accumulator measured by the first pressure sensor 101 rapidly decreases and is maintained at a low hydraulic pressure, or the pressure of the second pressure sensor 103 which measures the pressure of the first inlet path (BC1) 131 or the third pressure sensor 104 which measures the pressure of the second inlet path (BC2) 132 is the preset pressure B or less, the determiner 1210 determines that a leak has occurred at one of the first inlet path (BC1) 131 and the second inlet path (BC2) 132.

Next, when the determiner 1210 determines that a leak has occurred, the controller 1211 in the main processor 121 generates a control signal to secure braking performance of the electronic brake system 1 according to the embodiment of the present disclosure.

Specifically, FIG. 6 is a graph showing pressures of pressure sensors included in an electronic brake system of a vehicle according to one embodiment of the present disclosure according to time.

The graph shown in FIG. 6 shows a pressure measured by the first pressure sensor 101 over time, a pressure measured by second pressure sensor 103 configured to detect the pressure of the brake oil transmitted to the first inlet path (BC1) 131 over time, and a pressure measured by the third pressure sensor 104 configured to detect the pressure of the brake oil transmitted to the second inlet path (BC2) 132 over time.

For example, as illustrated in FIG. 6, the determiner 1210 continuously receives the value of the first pressure sensor 101 at time $t_1$ [sec], and when the pressure reduction rate is greater than the preset slope Si and the pressure of the first inlet path (BC1) 131 or the second inlet path (BC2) 132 measured by the second pressure sensor 103 or the third pressure sensor 104 is maintained at a value less than the preset pressure B, the determiner 1210 determines that a leak has occurred in one of the first inlet path (BC1) 131 or the second inlet path (BC2) 132.

At this time, the controller 1211 generates a control signal for forming the first inlet path (BC1) 131 and the second inlet path (BC2) 132 into closed circuits at time $t_1$ [sec] for a preset threshold time $t_b$. Specifically, the controller 1211 closes the apply valves 141 and 142 and closes the first and second cut valves 173 and 174 respectively provided at the first and second backup paths 171 and 172 at the same time to block the first and second backup paths 171 and 172.

Accordingly, braking oil provided to the wheel cylinders 20 through the first and second apply valves 141 and 142 does not back flow to the first and second backup paths 171 and 172. Accordingly, paths between the master cylinder 110 and the first and second cut valves 173 and 174 form closed circuits.

When amounts of change of the second pressure sensor 103 and the third pressure sensor 104 are measured within a predetermined time $t_c$ after the preset threshold time $t_b$ and satisfy the following expressions 1 to 3 after the closed circuits are formed, the first inlet path (BC1) 131 is determined to have failed.

$\Delta BC1 > BC1(t_1)$*first rate  <Expression 1>

$\Delta BC2 > BC2(t_1)$*second rate  <Expression 2>

$\Delta BC1 - \Delta BC2 >$ third threshold value  <Expression 3>

Specifically, when an amount of change of a pressure $\Delta BC1$ of the first inlet path (BC1) 131 measured by the second pressure sensor 103 at time $t_1$ [sec] and time $t_2$ [sec] is greater than a product of a pressure $BC1(t_1)$ at time $t_1$ [sec] at which the closed circuit is formed and a first rate, an amount of change of a pressure $\Delta BC2$ of the second inlet path (BC2) 132 measured by the third pressure sensor 104 at time $t_1$ [sec] and time $t_2$ [sec] is less than a product of a pressure $BC2(t_1)$ at time $t_1$ [sec] and a second rate, and a difference between $\Delta BC1$ and $\Delta BC2$ is greater than a preset third threshold value [bar], the controller 1211 determines that a leak has occurred in the first inlet path (BC1) 131.

At this time, the controller 1211 forms the first inlet path (BC1) 131 into a closed circuit and generates a control signal that allows the driver 13 to open the first apply valve 141 and performs braking control with only the second inlet path (BC2) 132.

In addition, although not illustrated in the drawings, when the amounts of change of the values of the second pressure sensor 103 and the third pressure sensor 104 are measured within the predetermined time $t_c$ and satisfy following expressions 4 to 6 after the closed circuits are formed and the preset threshold time $t_b$ has passed, the second inlet path (BC2) 132 is determined to have failed.

$\Delta BC1 < BC1(t_1)$*second rate  <Expression 4>

$\Delta BC2 > BC2(t_1)$*first rate  <Expression 5>

$\Delta BC2 - \Delta BC1 >$ third threshold value  <Expression 6>

Specifically, when the amount of change of the pressure $\Delta BC1$ of the first inlet path (BC1) 131 measured by the second pressure sensor 103 at time $t_1$ [sec] and time $t_2$ [sec] is less than a product of the pressure $BC1(t_1)$ at time $t_1$ [sec] at which the closed circuit is formed and the second rate, the amount of change of the pressure $\Delta BC2$ of the second inlet path (BC2) 132 measured by the third pressure sensor 104 at time $t_1$ [sec] and time $t_2$ [sec] is greater than a product of the pressure $BC2(t_1)$ at time $t_1$ [sec] and the first rate, and a difference between $\Delta BC2$ and $\Delta BC1$ is greater than the preset third threshold value, the controller 1211 determines that a leak has occurred in the second inlet path (BC1) 132.

At this time, the controller 1211 forms the second inlet path (BC1) 132 into a closed circuit, generates a control signal that allows the driver 13 to open the second apply valve 142 and performs braking control with only the first inlet path (BC1) 131.

Next, the memory 122 in the ECU 12 stores programs and data of the electronic brake system 1.

Specifically, the memory (not shown) 122 may include a nonvolatile memory such as a flash memory, a read-only memory (ROM), an erasable programmable ROM (EPROM), an electrically EPROM (EEPROM), and the like as well as a volatile memory such as a static random access memory (SRAM), a dynamic random access memory (DRAM), and the like.

A nonvolatile memory may be configured to semi-permanently store control programs and data for controlling operation of the electronic brake system 1, and a volatile memory may be configured to temporarily store the control programs and data read from the nonvolatile memory and may be configured to temporarily store various kinds of sensor information and various kinds of control signal output from the main processor.

In the above description, the components of the electronic brake system 1 according to the embodiment of the present disclosure have been described.

Hereinafter, FIGS. 7 to 10 are flowcharts showing control methods of the electronic brake system 1 according to the embodiment of the present disclosure.

Figure 7:
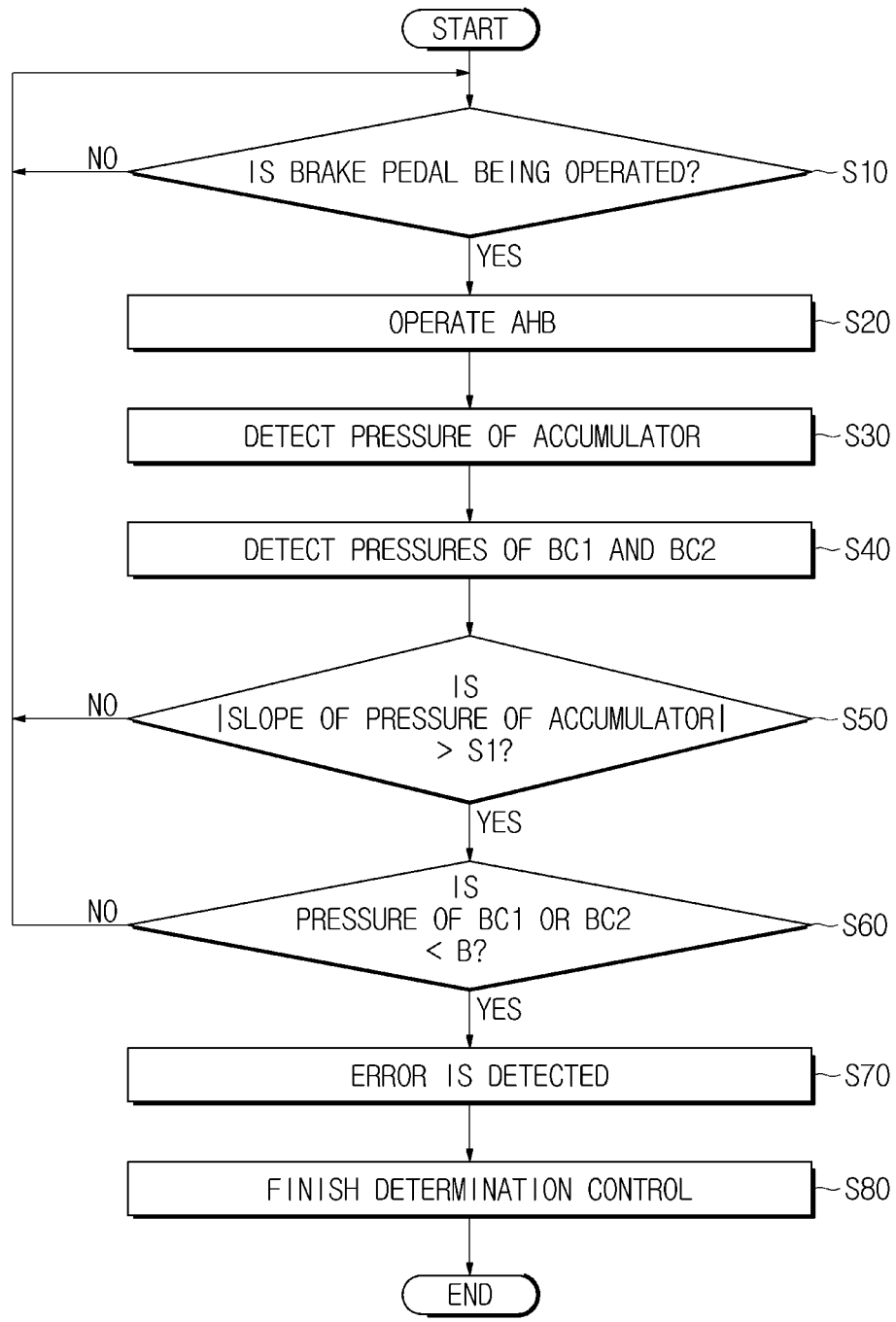
FIG. 7 is a flowchart showing failure determination in a hydraulic circuit diagram according to one embodiment of the present disclosure.
Figure 8:
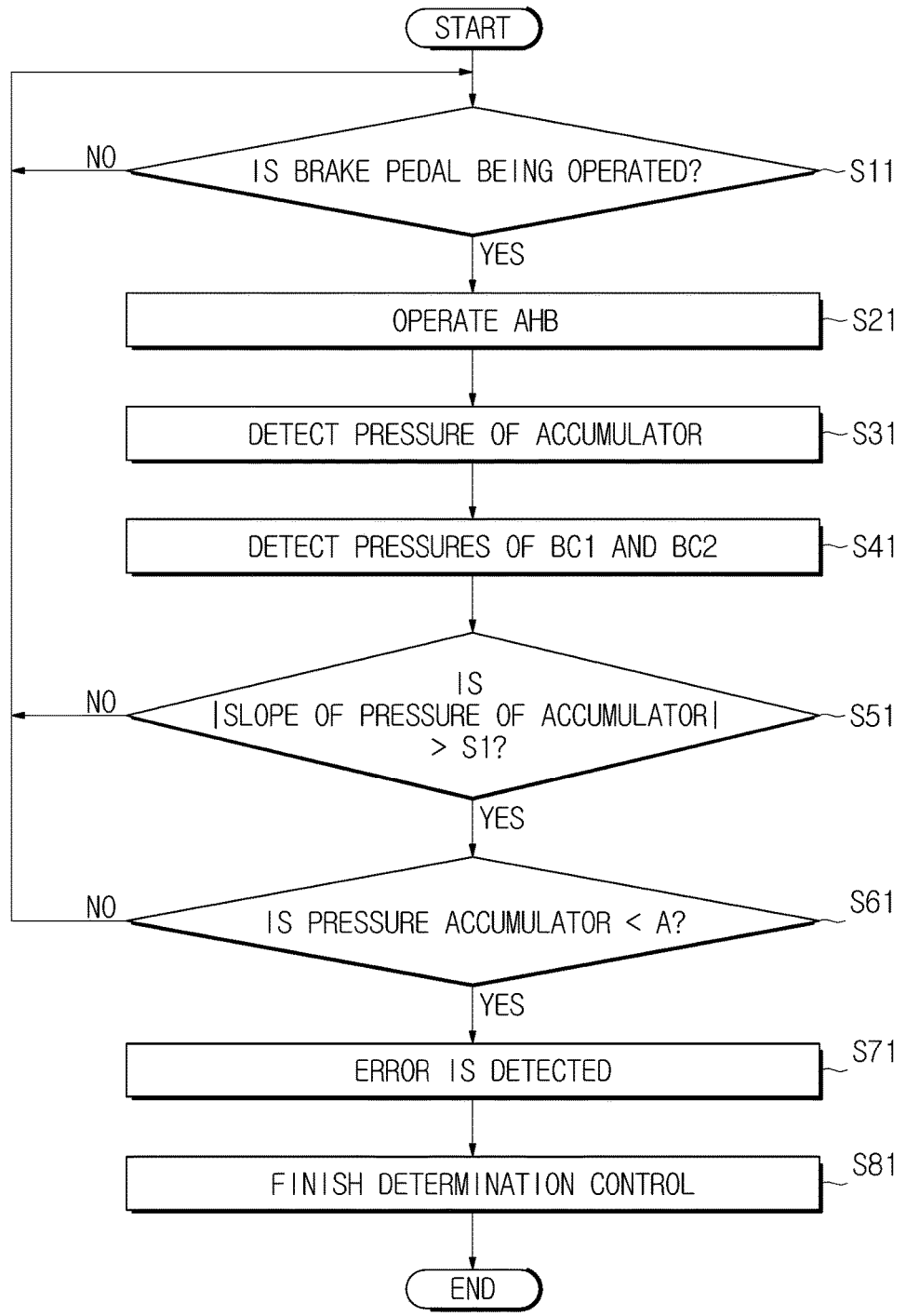
FIG. 8 is a flowchart showing failure determination in a hydraulic circuit diagram according to another embodiment of the present disclosure.

FIG. 7 is a flowchart showing failure determination in a hydraulic circuit diagram according to one embodiment of the present disclosure, and FIG. 8 is a flowchart showing failure determination in a hydraulic circuit diagram according to another embodiment of the present disclosure.

First, when a driver steps on the brake pedal 30, the ECU 12 determines whether the brake pedal 30 is being operated based on a pedal stroke detected by the pedal stroke sensor 105 (S10).

When the brake pedal 30 is being operated as a result of a determination of an operation mode, an AHB operation is performed to generate a brake pressure corresponding to the pedal stroke (S20). At this time, the ECU 12 performs the AHB operation through controlling a motor and various valves.

More specifically, the ECU 12 operates the motor 220 so that high pressure braking oil is filled in the accumulator 120 by an operation of the pump 210, opens the first and second apply valves 141 and 142 to supply the high pressure braking oil filled in the accumulator 120 to the wheel cylinders 20, closes the first and second cut valves 173 and 174 to block the first and second backup paths 171 and 172, and opens the simulation valve 186 of the pedal simulator 180 to generate a pedal simulator pressure corresponding to a reaction force of the brake pedal.

After the AHB operation is performed, the ECU 12 detects a pressure of the accumulator through the first pressure sensor 101 (S30).

In addition, the ECU 12 simultaneously detects a pressure of the first inlet path (BC1) 131 through the second pressure sensor 103 and detects a pressure of the second inlet path (BC2) 132 through the third pressure sensor 104 (S40).

At this time, when a magnitude of a measured pressure slope of the accumulator is greater than the preset slope Si (YES of S50), and the pressure of the first inlet circuit (BC1) 131 or the second inlet circuit (BC2) 132 is less than a preset threshold value B (YES of S60), the determiner 1210 determines that a failure has occurred in the electronic brake system 1 according to the embodiment of the present disclosure (S70 and S80).

In addition, as illustrated in FIG. 8, when a driver steps on the brake pedal 30, the ECU 12 determines whether the brake pedal 30 is being operated based on a pedal stroke detected by the pedal stroke sensor 105 (S11).

When the brake pedal 30 is being operated as a result of a determination of an operation mode, an AHB operation is performed to generate a brake pressure corresponding to the pedal stroke (S21). After the AHB operation is performed, the ECU 12 simultaneously detects a pressure of an accumulator through the first pressure sensor 101 (S31), detects a pressure of the first inlet path (BC1) 131 through the second pressure sensor 103, and detects a pressure of the second inlet path (BC2) 132 through the third pressure sensor 104 (S41).

At this time, when a magnitude of a measured pressure slope of the accumulator is greater than the preset slope Si (YES of S51) and a pressure of the first pressure sensor 101 is maintained at a value less than the preset pressure A for to seconds (S61), the determiner 1210 determines that a failure has occurred in the electronic brake system 1 according to the present embodiment of the present disclosure (S71 and S81).

Figure 9:
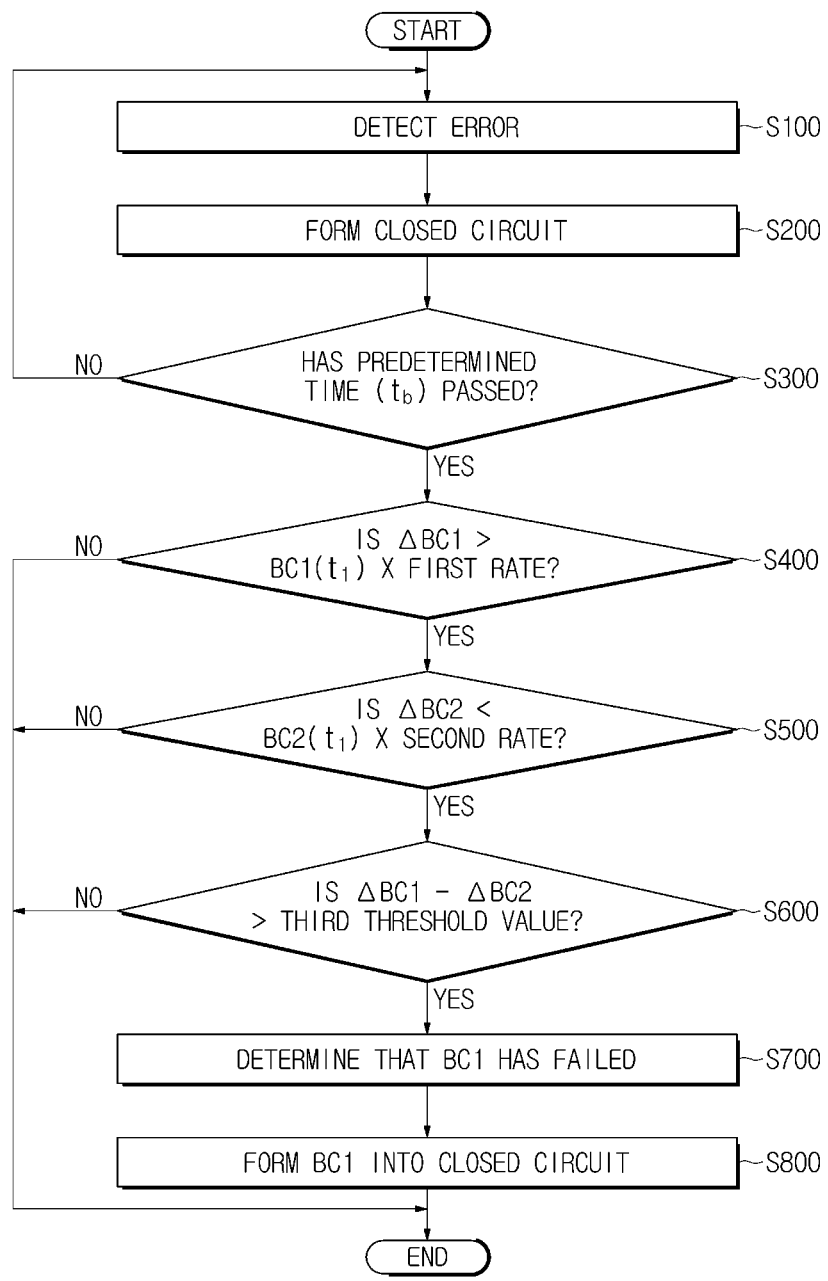
FIG. 9 is a flowchart showing a control method of an electronic brake system when a hydraulic circuit according to one embodiment of the present disclosure is determined to have failed.
Figure 10:
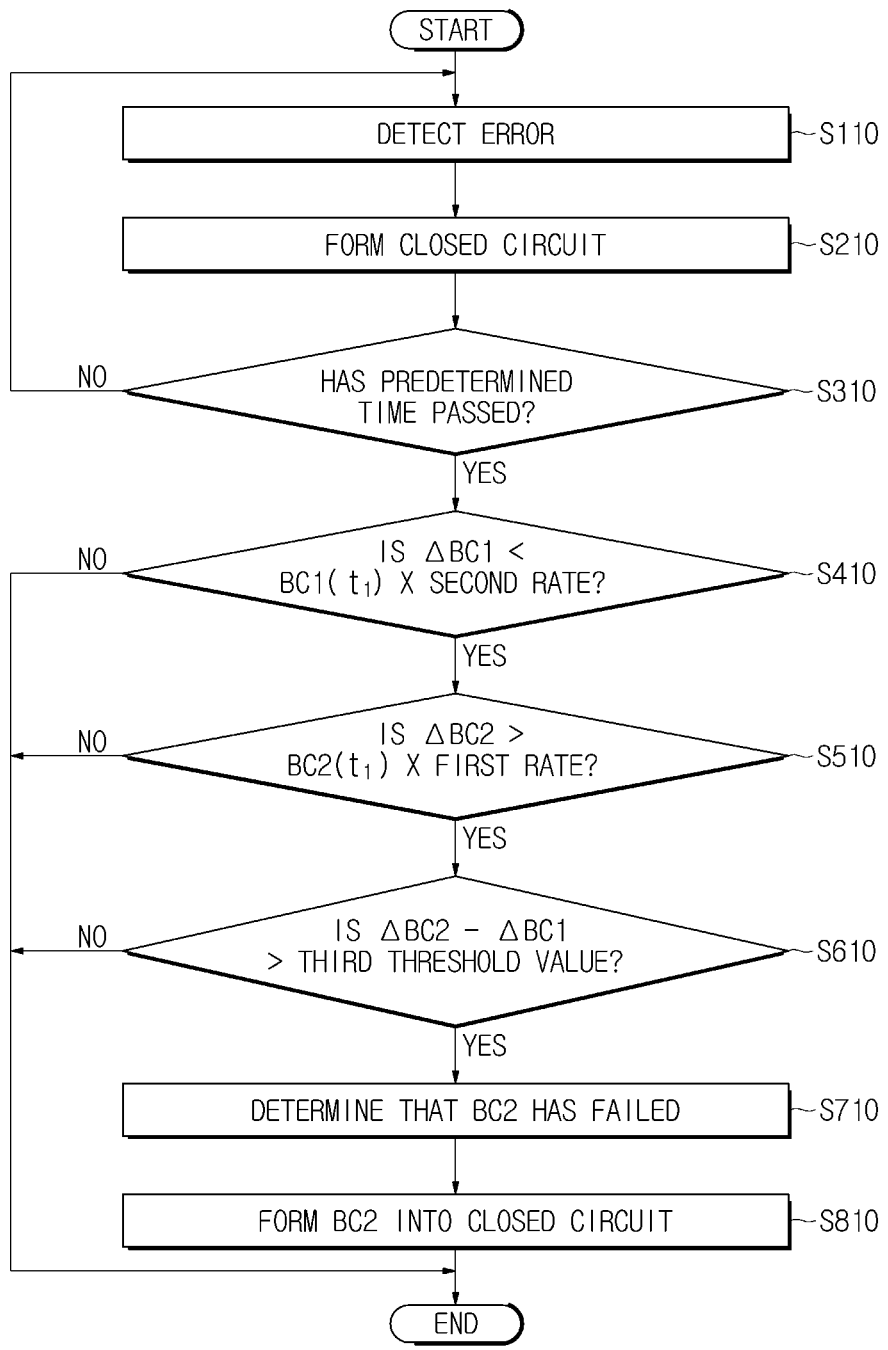
FIG. 10 is a flowchart showing a control method of an electronic brake system when a hydraulic circuit according to another embodiment of the present disclosure is determined to have failed.

Next, FIG. 9 is a flowchart showing a control method of an electronic brake system when a hydraulic circuit according to one embodiment of the present disclosure is determined to have failed, FIG. 10 is a flowchart showing a control method of an electronic brake system when a hydraulic circuit according to another embodiment of the present disclosure is determined to have failed.

First, as illustrated in FIG. 9, when abnormality is detected in the electronic brake system 1 according to the embodiment of the present disclosure (S100), the electronic brake system 1 forms closed circuits (S200). Specifically, the controller 1211 generates a control signal for forming the first inlet path (BC1) 131 and the second inlet path (BC2) 132 into closed circuits at time $t_1$ [sec] for the preset threshold time $t_b$ (S300).

When the preset threshold time $t_b$ has passed (YES of S300), $\Delta BC1$ is greater than a product of $BC1(t_1)$ and a first rate (YES of S400), $\Delta BC2$ is less than a product of $BC2(t_1)$ and a second rate (YES of S500), and a difference between $\Delta BC1$ and $\Delta BC2$ is greater than the preset third threshold value [bar] (S600), a leak is determined to have occurred in the first inlet path (BC1) 131 (S700).

At this time, the controller 1211 generates a control signal that allows the driver 13 to close the first apply valve 141 to form the first inlet path (BC1) 131 into a closed circuit (S800) and performs braking control only with the second inlet path (BC2) 132.

Next, as illustrated in FIG. 10, when abnormality is detected in the electronic brake system 1 according to another embodiment of the present disclosure (S110), the electronic brake system 1 forms closed circuits (S210). Specifically, the controller 1211 generates a control signal for forming the first inlet path (BC1) 131 and the second inlet path (BC2) 132 into closed circuits at time $t_1$ [sec] for the preset threshold time $t_b$ (S310).

When the predetermined threshold time $t_b$ has passed (YES of S300), $\Delta BC1$ is less than a product of $BC1(t_1)$ and a second rate (YES of S410), $\Delta BC2$ is greater than a product of $BC2(t_1)$ and a first rate (YES of S510), and a difference between $\Delta BC2$ and $\Delta BC1$ is greater than the third threshold value [bar], a leak is determined to have occurred in the second inlet path (BC1) 132 (S710).

At this time, the controller 1211 generates a control signal that allows the driver 13 to open the second apply valve 142 to form the second inlet path (BC2) 132 into a closed circuit (S810), and performs braking control only with the first inlet path (BC1) 131.

As is apparent from the above description, embodiments of the present disclosure can prevent a dangerous situation in which a braking force is not generated at all by determining a hydraulic circuit failure in advance.

In addition, the embodiments of the present disclosure can obtain braking performance necessary for satisfying a braking distance in accordance with a vehicle braking performance regulation during braking after a hydraulic brake circuit failure has occurred.

Although embodiments of the present disclosure have been illustrated and described, the present disclosure may not be limited to the above-described specific embodiments and various changes may be made to the embodiments by those skilled in the art without departing from a scope and spirit of the present disclosure defined by the appended claims, and such modifications may not be individually understood from the present disclosure.

What is claimed is:

1. An electronic brake system including a motor configured to drive a pump for pumping brake oil from a reservoir of a master cylinder, an accumulator configured to store the pumped brake oil according to operation of the pump driven by the motor, a first hydraulic circuit configured to control a hydraulic pressure generated by the accumulator to be transmitted to at least one first wheel, and a second hydraulic circuit configured to control the hydraulic pressure generated by the accumulator to be transmitted to at least one second wheel, the electronic brake system comprising:
- a pressure sensor including a first pressure sensor configured to measure a hydraulic pressure of the accumulator, a second pressure sensor configured to measure a hydraulic pressure of the first hydraulic circuit, and a third pressure sensor configured to measure a hydraulic pressure of the second hydraulic circuit;
- a driver including one or more apply valves and release valves configured to control the hydraulic pressures of the first hydraulic circuit and the second hydraulic circuit;
- a determiner configured to determine that at least one of the first hydraulic circuit and the second hydraulic circuit has failed when an absolute value of a slope of the pressure measured by the first pressure sensor is greater than a preset first threshold value and the pressure measured by the first pressure sensor is less than a preset second threshold value; and
- a controller configured to close apply valves of the first hydraulic circuit and the second hydraulic circuit when the failure has been determined, determine that a leak has occurred in one of the first and second hydraulic circuits having an amount of pressure change greater than that of the other hydraulic circuit measured on the basis of the second pressure sensor and the third pressure sensor, and control braking using only the hydraulic circuit operating normally.

2. The electronic brake system of claim 1, wherein the determiner further determines that at least one of the first hydraulic circuit and the second hydraulic circuit has failed when the absolute value of the slope of the pressure measured by the first pressure sensor is greater than the preset first threshold value, and at least one of the pressures measured by the second pressure sensor and the third pressure sensor is less than a preset third threshold value.

3. The electronic brake system of claim 2, wherein the determination that the leak has occurred in one of the first and second hydraulic circuits having the amount of pressure change greater than that of the other hydraulic circuit measured on the basis of the second pressure sensor and the third pressure sensor after the apply valves of the first hydraulic circuit and the second hydraulic circuit are closed determines that the leak has occurred in one of the first and second hydraulic circuits having an amount of pressure change greater than that of the other hydraulic circuit when a difference between the amount of pressure change measured by the second pressure sensor and the amount of pressure change measured by the third pressure sensor is greater than the preset third threshold value.

4. The electronic brake system of claim 3, wherein the determination that the leak has occurred in one of the first and second hydraulic circuits having the amount of pressure change greater than that of the other hydraulic circuit measured on the basis of the second pressure sensor and the third pressure sensor after the apply valves of the first hydraulic circuit and the second hydraulic circuit are closed is determined within a preset time.

5. The electronic brake system of claim 4, wherein:
the amount of pressure change measured by the second pressure sensor denotes a difference between a pressure measured at a time at which the apply valve included in the first hydraulic circuit is closed and a pressure measured after a preset first time from a time at which the apply valve is opened; and the amount of pressure change measured by the third pressure sensor denotes a difference between a pressure measured at a time at which the apply valve included in the second hydraulic circuit is closed and a pressure measured after the preset first time from a time at which the apply valve is closed.

6. The electronic brake system of claim 5, wherein the controller forms the hydraulic circuit that has been determined to have the leak into a closed circuit.

7. A control method of an electronic brake system including a motor configured to drive a pump for pumping brake oil from a reservoir of a master cylinder, an accumulator configured to store the pumped brake oil according to operation of the pump driven by the motor, a first hydraulic circuit configured to control a hydraulic pressure generated by the accumulator to be transmitted to at least one first wheel, and a second hydraulic circuit configured to control the hydraulic pressure generated by the accumulator to be transmitted to at least one second wheel, the control method comprising:
- measuring a hydraulic pressure of the accumulator, a hydraulic pressure of the first hydraulic circuit, and a hydraulic pressure of the second hydraulic circuit;
- driving valves included in the first hydraulic circuit and the second hydraulic circuit on the basis of the measured hydraulic pressure of the accumulator, the measured hydraulic pressure of the first hydraulic circuit, and the measured hydraulic pressure of the second hydraulic circuit;
- determining that at least one of the first hydraulic circuit and the second hydraulic circuit has failed when a magnitude of a slope of the measured hydraulic pressure of the accumulator is greater than a preset first threshold value and the measured hydraulic pressure of the accumulator is less than a preset second threshold value;
- closing apply valves included in the first hydraulic circuit and the second hydraulic circuit when the failure is determined;
- determining that a leak has occurred in one of the first and second hydraulic circuits having an amount of hydraulic pressure change greater than that of the other hydraulic circuit measured on the basis of the hydraulic pressures of the first hydraulic circuit and the second hydraulic circuit measured after the apply valves are closed; and
- determining that one of the first and second hydraulic circuits having an amount of hydraulic pressure change less than that of the other hydraulic circuit measured on the basis of the hydraulic pressures of the first hydraulic circuit and the second hydraulic circuit measured after the apply valves are closed operates normally, and controlling braking of only the hydraulic circuit operating normally.

8. The control method of claim 7, wherein the determining that the leak has occurred in one of the first and second hydraulic circuits having the amount of pressure change greater than that of the other hydraulic circuit measured on the basis of the second pressure sensor and the third pressure sensor after the apply valves of the first hydraulic circuit and the second hydraulic circuit is performed within a preset time.

9. The control method of claim 7, further comprising determining that at least one of the first hydraulic circuit and the second hydraulic circuit has failed when the magnitude of the slope of the hydraulic pressure of the accumulator is greater than the preset first threshold value and at least one of the hydraulic pressures of the first hydraulic circuit and the second hydraulic circuit is less than a preset third threshold value.

10. The control method of claim 9, wherein the determining that the leak has occurred in one of the first and second hydraulic circuits having the amount of hydraulic pressure change greater than that of the other hydraulic circuit measured on the basis of the hydraulic pressures of the first hydraulic circuit and the second hydraulic circuit after the apply valves are opened determines that the leak has occurred in one of the first and second hydraulic circuits having an amount of hydraulic pressure change greater than that of the other hydraulic circuit when a difference between the amount of hydraulic pressure change of the first hydraulic circuit and the amount of hydraulic pressure change of the second hydraulic circuit is greater than the preset third threshold value.

11. The control method of claim 10, wherein the amount of hydraulic pressure change denotes a difference between an amount of hydraulic pressure change measured at a time at which the apply valves are closed and an amount of hydraulic pressure change measured after a preset first time passes from a time at which the apply valves are opened.

12. The control method of claim 11, further comprising forming the one of the first and second hydraulic circuits that has been determined to have the leak into a closed circuit.

* * * * *